US 6,658,486 B2

(12) United States Patent
Buzbee et al.

(10) Patent No.: US 6,658,486 B2
(45) Date of Patent: Dec. 2, 2003

(54) SYSTEM AND METHOD FOR EFFICIENTLY BLOCKING EVENT SIGNALS ASSOCIATED WITH AN OPERATING SYSTEM

(75) Inventors: William B. Buzbee, Half Moon Bay, CA (US); James S. Mattson, Campbell, CA (US); Lacky V. Shah, Sunnyvale, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 0 days.

(21) Appl. No.: 09/030,500

(22) Filed: Feb. 25, 1998

(65) Prior Publication Data

US 2002/0026534 A1 Feb. 28, 2002

(51) Int. Cl.⁷ .................................................. G06F 9/46
(52) U.S. Cl. ...................................................... 709/318
(58) Field of Search ................................. 709/318, 310

(56) References Cited

U.S. PATENT DOCUMENTS

| 4,720,778 | A |   | 1/1988  | Hall et al. ..................... 714/38  |
| 4,870,610 | A |   | 9/1989  | Belfer ........................... 704/2    |
| 5,237,684 | A | * | 8/1993  | Record et al. ................. 709/318  |
| 5,305,454 | A | * | 4/1994  | Record et al. ................. 709/318  |
| 5,355,484 | A | * | 10/1994 | Record et al. ................. 717/127  |
| 5,600,790 | A | * | 2/1997  | Barnstijn et al. .............. 714/38   |
| 5,608,908 | A | * | 3/1997  | Barghouti et al. ........... 709/318    |
| 5,678,047 | A |   | 10/1997 | Golshani et al. ............. 717/138   |
| 5,732,210 | A |   | 3/1998  | Buzbee ......................... 714/38  |
| 5,764,962 | A |   | 6/1998  | Buzbee ......................... 703/23  |
| 5,828,882 | A | * | 10/1998 | Hinckley ...................... 709/318  |
| 5,854,928 | A |   | 12/1998 | Buzbee ......................... 717/158 |
| 6,269,409 | B1 | * | 7/2001 | Solomon ....................... 709/318  |
| 6,438,618 | B1 | * | 8/2002 | Lortz et al. .................. 345/672  |

OTHER PUBLICATIONS

Cmelik et al., "Shade: A Fast Instruction–Set Simulator for Execution Profiling," Association for Computing Machinery (ACM, Inc.), 1994.

Cmelik et al., "Shade: A Fast Instruction–Set Simulator for Execution Profiling," Technical Report UWCSE 93–06–06, University of Washington and Sun Microsystems, Inc., 1993, pp. 1–41.

* cited by examiner

Primary Examiner—John Follansbee
Assistant Examiner—Lewis A. Bullock, Jr.

(57) ABSTRACT

A blocking system intercepts communications between a software program and an operating system in order to handle blocking and unblocking of event signals. The blocking system intercepts system calls to the operating system requesting the blocking and unblocking of event signals and keeps track of which event signals are blocked and unblocked without delivering the system calls to the operating system. The blocking system also intercepts event signals from the operating system and only allows unblocked event signals to pass to the software program. Blocked event signals received by the blocking system are discarded until the program unblocks the blocked event signals. After unblocking an event signal, the blocking system determines whether a corresponding event signal was previously received and blocked. If so, the blocking system transmits a signal indicating that the event corresponding to the event signal occurred.

6 Claims, 3 Drawing Sheets

SYSTEM AND METHOD FOR EFFICIENTLY BLOCKING EVENT SIGNALS ASSOCIATED WITH AN OPERATING SYSTEM

FIELD OF THE INVENTION

The present invention generally relates to computer systems and, in particular, to a system and method for efficiently blocking event signals associated with an operating system.

BACKGROUND OF THE INVENTION

Operating systems control the allocation and usage of hardware resources associated with a computer system. Typically, an operating system has a list of events that might occur while a software program associated with the operating system is executing. When one of the listed events occurs, the operating system sends a signal to the program indicating the occurrence of the event. For example, the functionality of a software program may depend on an expiration of a certain amount of time such as in the situation where a program allows a certain amount of time for a user to enter an input. If the user fails to enter the input within the certain amount of time, then the operating system detects a timer alarm indicating that the time period has expired. In response, the operating system transmits an event signal indicating that the time for entering the input has expired. By processing the event signal, the program becomes aware that the user has failed to enter the input.

Usually, the operating system will only transmit an event signal when the program has a corresponding signal handler capable of handling the event signal. A signal handler is a portion of a software program that processes event signals from the operating system. The operating system typically has knowledge of which signal handlers are contained in a program and, hence, which event signals can be processed by the program. Therefore, upon detecting an occurrence of a timer alarm event, for example, the operating system will first determine whether the computer program has a signal handler designed to process an event signal corresponding to the timer alarm. If such a signal handler exists, the operating system will transmit a timer alarm event signal to the program.

Upon receiving an event signal, the program will invoke the signal handler capable of handling the event signal. The signal handler then takes the necessary steps so that the program may continue executing in an appropriate manner in view of the occurrence of the associated event. If no signal handler exists to handle the event signal, then the operating system refrains from transmitting the event signal.

There are times during the execution of the program that it is desirable for the program not to receive certain event signals from the operating system. For example, a portion of the program may enter a critical region where the processing of certain event signals causes errors to occur. In this regard, the program may enter into a region where certain data is accessed and manipulated. In processing a particular event, the signal handler may also access and manipulate certain data. As can be appreciated by one skilled in the art, if the signal handler interrupts the execution of the critical region of the program and manipulates data that is currently being accessed and manipulated by the program, an error can occur. Therefore, it is desirable to block certain event signals from occurring when the program enters a critical region where, for example, certain data would be manipulated by both the program and the signal handler if certain events occur.

In order to block certain event signals from occurring, the program sends a system call to the operating system requesting the operating system to block a particular event signal from occurring. In response, the operating system typically indicates that the particular event signal is blocked by setting a particular flag corresponding to the event signal. When an event occurs, the operating system checks the appropriate flag to determine if the corresponding event signal has been blocked. If the flag is not set, then the event signal is not blocked, and the operating system delivers the event signal to the program. However, if the flag is set, indicating that the event signal is blocked, then the operating system refrains from sending the event signal. Instead, the operating system simply notes that the event occurred and that the corresponding event signal was blocked.

After blocking an event signal by the foregoing procedures, it may be desirable for the program to unblock the event signal. For example, the program may leave the critical portion of the program and, therefore, no longer need the event signal to be blocked. In order to unblock the blocked event signal, the program sends another system call to the operating system requesting the operating system to unblock the blocked event signal. At this point, the operating system clears the flag corresponding to the blocked event signal so that any future occurrences of the corresponding event will result in the delivery of an event signal to the program. Furthermore, after unblocking the event signal, the operating system also determines if the event signal was previously attempted but blocked during the blocking period. If so, the operating system transmits a signal to the program indicating the occurrence of the corresponding event, and the program processes the signal accordingly.

Although the blocking and unblocking process outlined hereinabove successfully prevents the occurrence of an event signal during the execution of particular portions of the program, the blocking and unblocking process is very costly to the efficient operation of many applications. Each system call usually requires the machine state of the operating system to be saved and usually requires the operating system to transition from a lower to higher privileged mode of operation. Therefore, the performance of programs having a high frequency of blocking and unblocking system calls is significantly degraded.

Thus, a heretofore unaddressed need exists in the industry for providing a system and method of efficiently blocking and unblocking event signals associated with an operating system.

SUMMARY OF THE INVENTION

The present invention overcomes the inadequacies and deficiencies of the prior art as discussed herein. The present invention provides a system and method for efficiently blocking and unblocking event signals associated with an operating system.

The present invention utilizes a computer software program, an operating system, a process data structure and a translation device. The process data structure maintains data values indicating which event signals are blocked and which are unblocked. The software program transmits a system call indicating that a particular event signal is to be blocked or unblocked. The translation device receives and interprets the system call and then updates the process data structure.

The operating system is configured to generate an event signal upon the occurrence of an event. The translation device receives the event signal and analyzes the process data structure to determine if the event signal is blocked. If the event signal is blocked, then the translation device records that the detection of the event signal and discards the event signal. However, if the event signal is not blocked, the translation device delivers the event signal to the program.

In accordance with another feature of the present invention, the translation device is configured to update a pending data structure indicating which blocked event signals have been previously received by the translation device. After unblocking an event signal, the translation device is designed to analyze the pending data structure to determine whether the event signal was previously received but not delivered to the program. If so, the translation device is configured to transmit a signal to the program indicating that an event corresponding to the event signal has occurred.

The present invention has many advantages, a few of which are delineated hereafter, as mere examples.

An advantage of the present invention is that blocking and unblocking of event signals associated with an operating system may occur without requiring the operating system to process system calls.

Another advantage of the present invention is that the amount of time required to block and unblock event signals is reduced thereby increasing the efficiency of an application.

Another advantage of the present invention is that the number of transitions from a lower to higher privileged mode by the operating system is reduced.

Other features and advantages of the present invention will become apparent to one skilled in the art upon examination of the following drawings in the detailed description. It is intended that all such features and advantages be included herein within the scope of the present invention, as is defined by the claims.

BRIEF DESCRIPTION OF THE DRAWINGS

The invention can be better understood with reference to the following drawings. The elements of the drawings are not necessarily to scale relative to each other, emphasis instead being placed upon clearly illustrating the principles of the invention. Furthermore, like reference numerals designate corresponding parts throughout the several views.

DETAILED DESCRIPTION OF THE INVENTION

Figure 1:
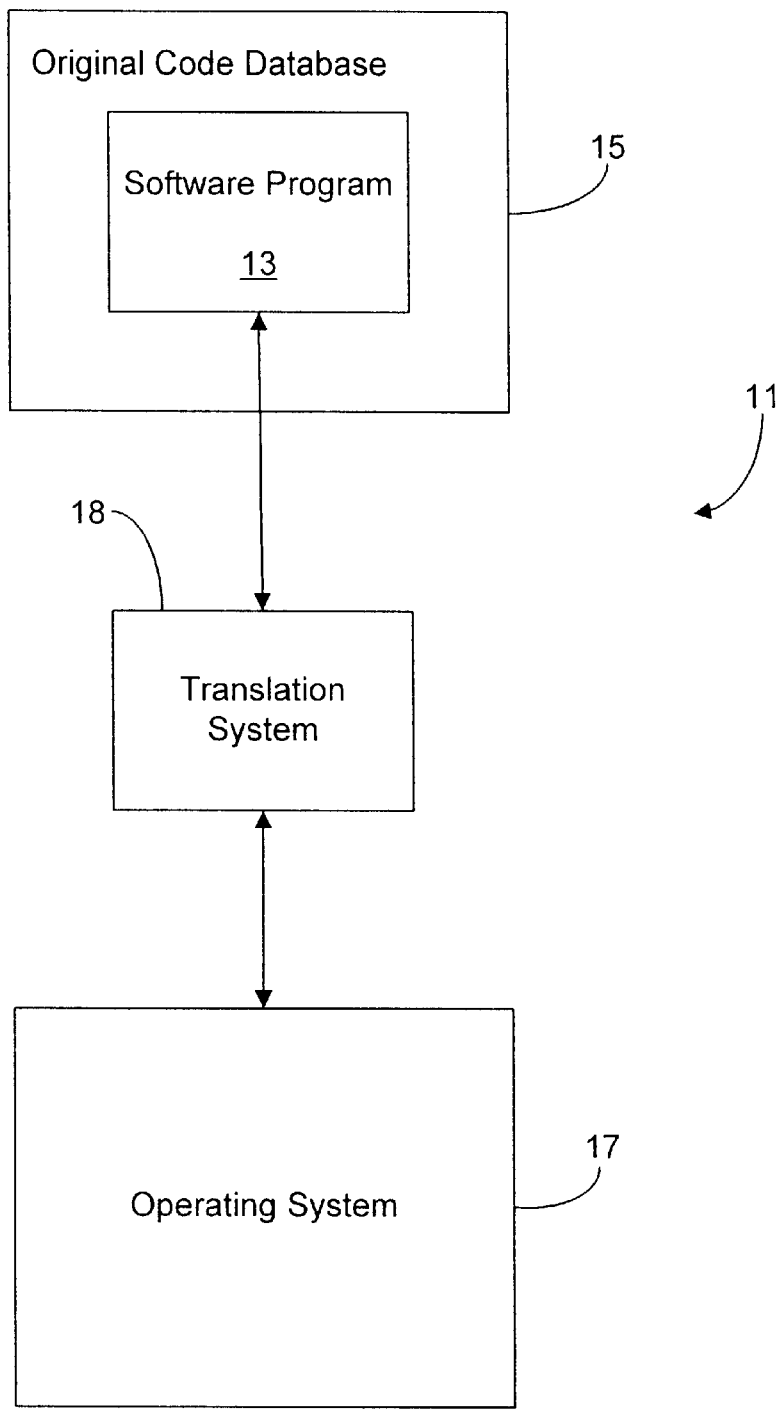
FIG. 1 is a block diagram illustrating a translation system in accordance with the prior art.

FIG. 1 depicts a computer system 11 of the prior art. As known in the art, instructions from a computer software program 13 in an original code database 15 are executed by an operating system 17. As noted hereinabove, many of the instructions may represent system calls to the operating system 17 requesting the blocking and unblocking of event signals. Operating system 17 uses the system calls to determine whether or not to transmit an event signal upon the occurrence of a corresponding event.

Oftentimes, it is desirable for translation system 18 to translate the software program 13 into another form for execution on operating system 17. In this regard, software program may be incompatible with operating system 17, and translation system 18 is, therefore, designed to translate software program 13 into a form compatible with operating system 17. Alternatively, translation system 18 may simply translate software program 13 into a more desirable or efficient form for execution by operating system 17.

In translating software program 13, the translation system 18 interprets individual instructions within software program 13 and determines an equivalent set of instructions that are compatible with operating system 17. The translation system 18 then transmits the equivalent set of instructions to operating system 17 which executes the equivalent set of instructions. An example of such a translation system 18 is disclosed in co-pending U.S. patent application Ser. No. 09/030,734, filed on Feb. 25, 1998, by Buzbee et al. and entitled "Dynamic Translation System and Method for Optimally Translating Computer Code," which is incorporated herein by reference as if set out in full hereinbelow.

A problem with most prior art computer systems 11 is that system calls to operating system 17 are typically costly in the amount of time they require for execution. Therefore, the efficiency of programs 13 that include a large number of blocking and unblocking system calls is adversely affected.

The present invention is a blocking system that enables efficient blocking and unblocking of event signals by intercepting system calls destined for operating system 17 and event signals destined for software program 13. The blocking system uses the system calls to keep track of the status of the event signals and delivers an event signal only when its status indicates that it is not blocked. Furthermore, the blocking system is preferably utilized in conjunction with translation system 18 which is designed to interpret signals transmitted by software program 13 and operating system 17.

The blocking system of the present invention can be implemented in software, hardware, or a combination thereof. In the preferred embodiment, as illustrated by way of example in FIG. 2, the blocking system 20 of the present invention along with its associated methodology is implemented in software and stored in computer memory 21 of a computer system 23. Note that the blocking system 20 can be stored on any computer-readable medium for use by or in connection with a computer-readable system or method. In the context of this document, a computer-readable medium is an electronic, magnetic, optical, or other physical device or means that can contain or store a computer program for use by or in connection with a computer-related system or method. As an example, the blocking system 20 may be magnetically stored and transported on a conventional portable computer diskette.

Figure 2:
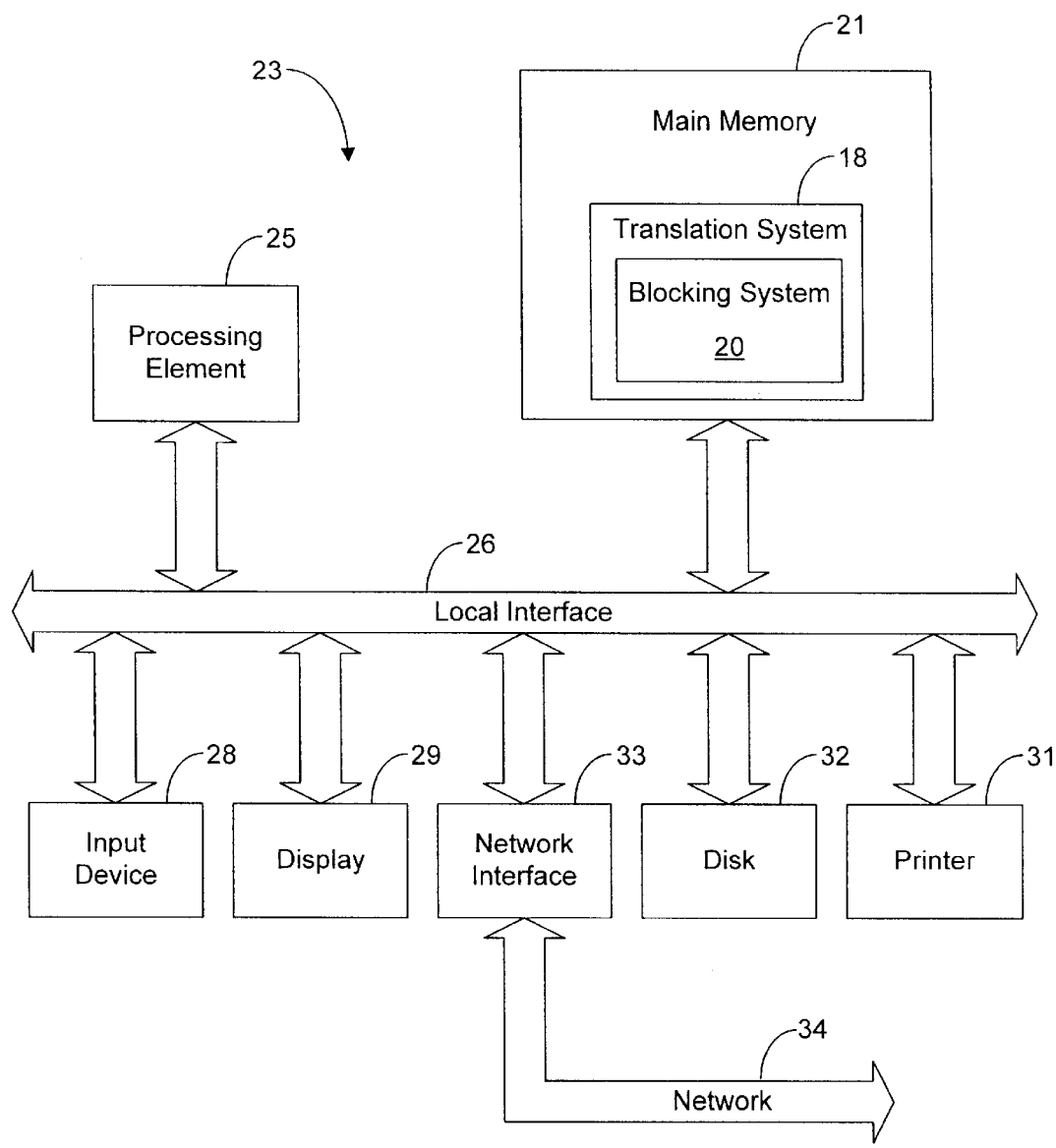
FIG. 2 is a block diagram illustrating a computer system employing a blocking system in accordance with the principles of the present invention.

The preferred embodiment of the computer system 23 of FIG. 2 comprises one or more conventional processing elements 25, such as a digital signal processor (DSP), that communicate to the other elements within the system 23 via a local interface 26, which can include one or more buses. Furthermore an input device 28, for example, a keyboard or a mouse, can be used to input data from a user of the system 23, and screen display 29 or a printer 31 can be used to output data to the user. A disk storage mechanism 32 can be connected to the local interface 26 to transfer data to and from a nonvolatile disk (e.g., magnetic, optical. etc.). The system 23 can be connected to a network interface 33 that allows the system 23 to exchange data with a network 34.

Figure 3:
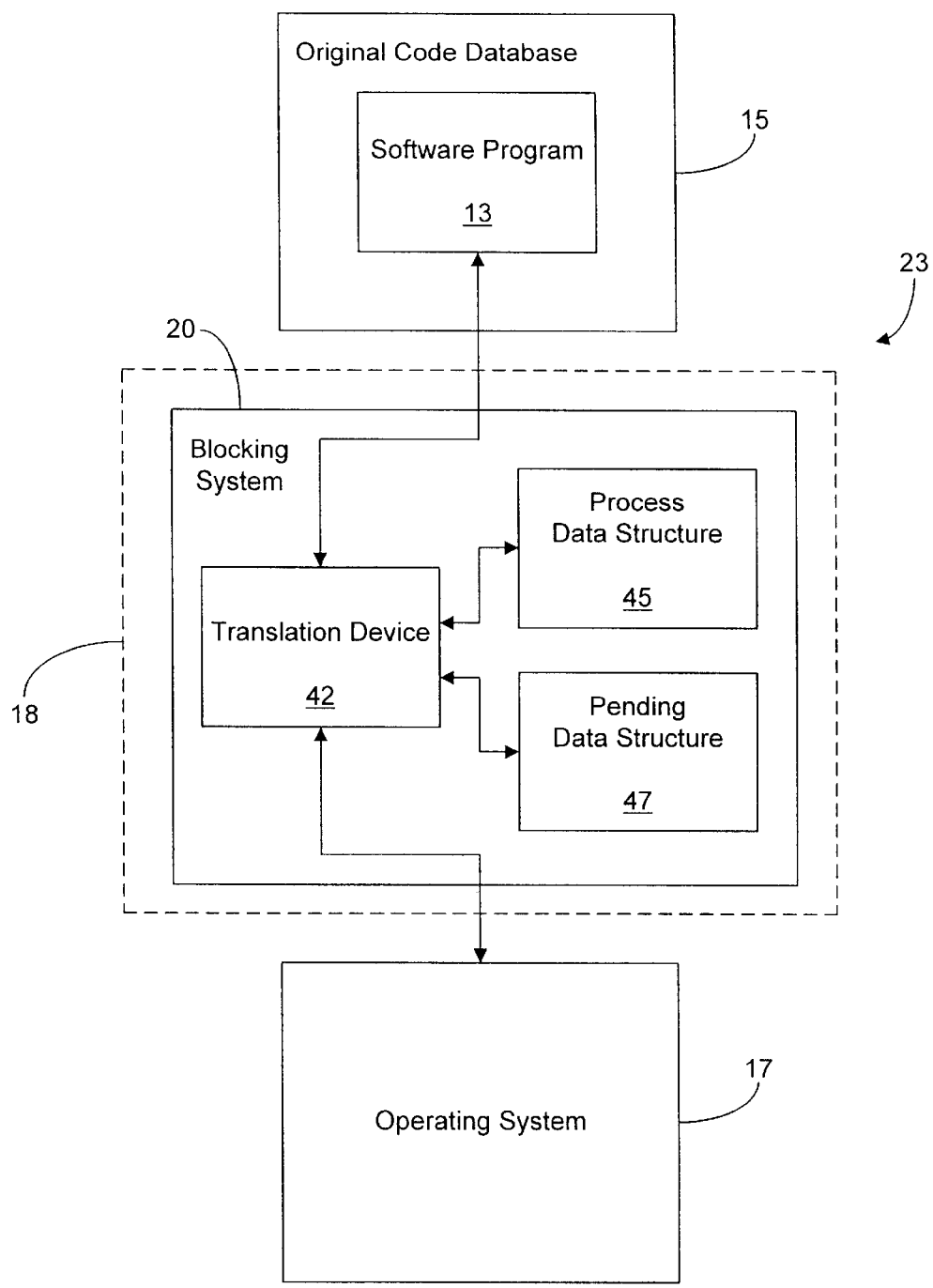
FIG. 3 is a block diagram illustrating the blocking system of FIG. 2.

FIG. 3 depicts the blocking system 20 of the present invention. The blocking system 20 includes a translation device 42 that receives and interprets instructions from software program 13. In situations where it would be desirable for software program 13 to be translated into another form for execution by operating system 17, translation device 42 is further configured to translate the instructions from software program 13 into another form compatible with operating system 17. In interpreting the instructions of program 13, translation device 42 is designed to determine whether an instruction is a blocking or an unblocking system call to operating system 17. Blocking and unblocking system calls refer to herein as system calls pertaining to a blocking or an unblocking of an event signal. If an instruction is not a blocking or an unblocking system call, then translation device 42 merely transmits an equivalent set of compatible instructions to operating system 17.

However, if an instruction is a blocking or an unblocking system call, then translation device 42 is designed to make an entry into a process data structure 45 and to discard the system call. Process data structure 45 is configured to maintain data indicating which event signals are blocked. The entry made by translation device 42 updates the data in process data structure 45 for the received system call. By updating the process data structure 45, the blocking system 20 keeps up with which event signals are currently blocked and which event signals are currently unblocked.

Process data structure 45 is preferably configured to be a bit vector wherein each bit corresponds to a particular event signal. After detecting a block system call for a particular event signal, translation device 42 is designed to set the bit in process data structure 45 corresponding to the particular event signal. Furthermore, after detecting an unblock system call for a particular event signal, translation device 42 is designed to reset the bit in process data structure 45 corresponding to the particular event signal. Therefore, each bit in process data structure 45 is designed to act as flag which, when set, indicates that the corresponding event signal is blocked. Therefore, by analyzing the bits of process data structure 45, it can be determined which event signals are blocked and which are unblocked.

Translation device 42 is also designed to receive event signals from operating system 17. Before transmitting a received event signal to software program 13, translation device 42 is configured to compare the bit in process data structure 45 corresponding to the event signal in order to determine whether or not the event signal is blocked. If the event signal is not blocked, then translation device 42 is configured to merely transmit the event signal to software program 13. When desirable, translation device 42 is further configured to translate the event signal into another form compatible with software program 13. However, if the event signal is blocked, then translation device 42 is designed to discard the event signal and to make an entry into pending data structure 47.

Pending data structure 47 is designed to indicate which event signals have been received by translation device 42 and discarded because they were determined to have been blocked at the time of reception by translation device 42. In this regard, pending data structure 47 is preferably a bit vector with each bit corresponding to a particular event signal. After discarding a blocked event signal, translation device 42 is designed to set the corresponding bit in pending data structure 47.

Once translation device 42 receives an unblock system call, translation device is designed to update the process data structure 45 as indicated hereinabove and is further designed to analyze the corresponding bit in the pending data structure 47. If the bit is set, then translation device 42 is designed to send an event signal to software program 13 indicating that the event corresponding to the set bit has occurred. Furthermore, translation device 42 is also designed to reset the bit in pending data structure 47 to indicate that the software program 13 has now been notified of the corresponding event. By appropriately setting and resetting the bits in pending data structure 47, translation device 42 is configured to continually update the pending data structure 47 so that the pending data structure 47 continuously indicates which event signals have been transmitted by operating system 17 but not received by software program 13.

OPERATION

The preferred use and operation of the blocking system 20 and associated methodology are described hereafter.

Initially, translation device 42 calls operating system 17 in order to determine which event signals are currently blocked. Translation device 42 then initializes the process data structure 45 by setting each bit corresponding to a blocked event signal. Translation device 42 then instructs operating system 17 to unblock all event signals so that operating system 17 will transmit an event signal on the occurrence of any event, and translation device 42 resets each bit in pending data structure 47. Translation system 42 then intercepts and interprets all signals transmitted between software program 13 and operating system 17. Any signal not pertaining to event signals is transmitted by translation device 42 to the appropriate device 13 or 17. When desirable, the translation device 42 translates the signal into another compatible form before transmitting the signal. Intercepted signals pertaining to event signals are discussed hereafter.

Assume, for illustrative purposes only, that software program 13 enters into a region where it is not desirable to receive event signals regarding timer alarms, for example. Software program 13, therefore, transmits a system call to operating system 17 requesting operating system 17 to block event signals associated with timer alarms. Translation device 42 intercepts the system call and interprets the system call during the translation process of translation system 18. While interpreting, translation device 42 determines that the system call is a request to block event signals associated with timer alarms. Translation device 42 then discards the system call and sets the appropriate flag in process data structure 45 to indicate that timer alarm event signals are blocked.

While process data structure 45 is indicating that timer alarm event signals are blocked, assume that a timer alarm occurs. In response to the timer alarm, the operating system 17, in accordance with prior art procedures, determines whether timer alarm event signals are blocked. Operating system 17 is not aware that software program 13 has requested the blocking of all timer alarm event signals because translation device 42 never delivered the system call requesting the blocking of timer alarm event signals to operating system 17. Therefore, operating system 17, believing that timer alarm event signals are not blocked, generates and transmits a timer alarm event signal.

Translation device 42 intercepts the timer alarm event signal and, in translating the event signal, discovers that the signal is a timer alarm event signal. Therefore, translation device 42 analyzes the bit in process data structure 45 corresponding to timer alarm event signals and determines that timer alarm event signals are blocked. Accordingly, translation device 42 discards the timer alarm event signal and sets the appropriate bit in pending data structure 47 to indicate that a timer alarm event signal was received by translation device 42 but not delivered to software program 13.

Once the execution of software program 13 leaves the critical portion and the blocking of timer alarm event signals is no longer needed, software program 13 transmits a system call to unblock timer alarm event signals. Translation device 42 intercepts the system call and determines that it is a request to unblock timer alarm event signals. In response, translation device 42 discards the system call and resets the bit in process data structure 45 corresponding to timer alarm event signals.

Translation device 42 then analyzes the bit in pending data structure 47 corresponding to timer alarm event signals. If the bit is not set, then translation device 42 does nothing further to process the received unblocking system call. However, since a timer alarm event signal was previously blocked, the bit should be set. Therefore, translation device 42 transmits a signal to software program 13 indicating that a timer alarm event signal occurred and then resets the bit in pending data structure 47 pertaining to timer alarm event signals.

Now assume another timer alarm event occurs. Operating system 17 again transmits a timer alarm event signal which is intercepted by translation device 42. Translation device analyzes the bit in process data structure 45 corresponding to timer alarm event signals and determines that timer alarm event signals are not blocked since the corresponding bit is now reset. Therefore, translation device 42 merely transmits the timer alarm event signal to software program 13. If desired, translation device 42 translates the timer alarm event signal into another form compatible with software program 13 before transmitting it.

Although the operation of the present invention has been discussed hereinabove with reference to timer alarm event signals, it should be apparent to one ordinarily skilled in the art that other event signals can be handled and processed in the same way.

Since translation system 18 interprets signals transmitted between a software program 13 and an operating system 17, implementing the blocking system 20 within a translation system 18 is preferable. However, it should be noted that it is not necessary for the present invention to be implemented in the context of a translation system 18. For example, the blocking system 20 can be implemented in a stand alone configuration or within other interface systems provided that there is a device similar to translation device 42 that can determine when software program 13 is transmitting a system call and when operating system 17 is transmitting an event signal.

In concluding the detailed description, it should be noted that it will be obvious to those skilled in the art that many variations and modifications may be made to the preferred embodiment without substantially departing from the principles of the present invention. All such variations and modifications are intended to be included herein within the scope of the present invention, as set forth in the following claims.

Now, therefore, the following is claimed:

1. A system for selectively blocking event signals associated with operating systems, comprising:
   memory for storing an application program;
   an operating system configured to detect an occurrence of an event and to determine, in a first determination and in response to said occurrence, whether said application program is associated with a signal handler that is configured to respond to said occurrence, said operating system configured to determine, in a second determination and in response to said first determination, whether said operating system is enabled to notify said signal handler of said occurrence, said operating system further configured to transmit an event signal indicative of said occurrence in response to said second determination, if said operating system, via said second determination, determines that said operating system is enabled to notify said signal handler of said occurrence;
   a first data structure having a plurality of values, said plurality of values indicating whether corresponding event signals are blocked; and
   a device separate from said operating system, said device responsive to system calls for controlling said plurality of values in said first data structure and responsive to said event signal from said operating system for analyzing one of said plurality of values corresponding to said event signal in order to determine whether said event signal is blocked, wherein said device is configured to receive a signal from said application program and to translate said application program signal from a form incompatible with said operating system into a form compatible with said operating system and send the translated signal to said operating system,
   wherein said device transmits a signal indicative of said occurrence if said device determines that said event signal is not blocked based on said one of said plurality of values, and wherein said device is responsive to an unblocking system call for analyzing one of said second plurality of values and for transmitting a particular signal when said one of said second plurality of values indicates that said blocked event signal has been received by said device.

2. The system of claim 1, wherein said particular signal corresponds to said blocked event signal.

3. A system for selectively blocking event signals associated with operating systems, comprising:
   memory for storing an application program;
   an operating system configured to detect an occurrence of an event and to determine, in a first determination and in response to said occurrence, whether said application program is associated with a signal handler that is configured to respond to said occurrence, said operating system configured to determine, in a second determination and in response to said first determination, whether said operating system is enabled to notify said signal handler of said occurrence, said operating system further configured to transmit an event signal indicative of said event in response to said second determination, if said operating system, via said second determination, determines that said operating system is enabled to notify said signal handler of said occurrence;
   a first data structure having a first value indicating whether said event signal is blocked; and
   a device separate from said operating system, said device responsive to a signal from said application program for updating said first value in said first data structure, said device configured to receive said event signal from said operating system and to analyze said first value in response to said event signal, said device further configured to update a second value, in response to said event signal, if said first value indicates that said event signal is blocked when said device receives said event signal, said device further configured to analyze said second value in response to said signal from said application program, wherein said device, in response to said signal from said application program and based on said second value, is further configured to transmit to said signal handler a signal indicating said occurrence of said event, wherein said device is configured to receive a signal from said application program and to translate said application program signal from a form incompatible with said operating system into a form compatible with said operating system and send the translated signal to said operating system.

4. The system of claim 3, wherein said operating system bases said second determination on whether said operating system has received from said application program a system call for blocking event signals associated with said event.

5. A system for selectively blocking event signals associated with operating systems, comprising:

memory for storing an application program, said application program associated with a signal handler that is configured to respond to an occurrence of an event;

an operating system configured to determine, in response to said occurrence whether said operating system is enabled to notify said signal handler of said occurrence, said operating system further configured to transmit an event signal indicative of said occurrence if said operating system determines that said operating system is enabled to notify said signal handler of said occurrence; and a device separate from said operating system, said device configured to update a first value in response to requests from said application program, said first value indicative of whether said event signal is blocked, said device configured to receive said event signal from said operating system and to determine, based on said first value, whether to notify said event handler in response to said event signal, said device further configured to update a second value if said device receives said event signal while said first value indicates that said event signal is blocked, said device further configured to determine, based on said second value and in response to one of said requests, whether to notify said signal handler of said occurrence.

6. A method for selectively blocking event signals associated with operating systems, comprising the steps of:

detecting an occurrence of an event;

identifying a signal handler in response to said detected occurrence;

determining whether an operating system is enabled to notify said signal handler of said detected occurrence;

transmitting an event signal in response to a determination in said determining step that said operating system is enabled to notify said signal handler of said detected occurrence;

receiving said event signal;

adjusting, based on requests received from an application program that is associated with said signal handler, a first value that indicates whether said event signal is blocked;

determining, based on said first value and in response to said receiving step, whether said received event signal is blocked;

updating a second value in response to a determination in said determining step that said event signal is blocked;

determining, based on said second value and in response to one of said requests, whether to notify said signal handler of said detected occurrence; and transmitting a notification of said detected occurrence to said event handler based on one of said determining steps.

* * * * *